United States Patent [19]

Maras et al.

[11] Patent Number: 5,301,102
[45] Date of Patent: Apr. 5, 1994

[54] MULTIVARIABLE CONTROL OF A KAMYR DIGESTER

[75] Inventors: J. Todd Maras, Columbia, Md.; Peter A. Clark, Groton, N.Y.

[73] Assignee: Westvaco Corporation, New York, N.Y.

[21] Appl. No.: 772,159

[22] Filed: Oct. 7, 1991

[51] Int. Cl.$^5$ ............................................. G06F 15/46
[52] U.S. Cl. .................................. 364/164; 364/165; 364/153
[58] Field of Search ............. 364/164, 165, 158, 148, 364/149, 150, 151, 152, 153, 154, 155, 156, 157, 159; 162/DIG. 10

[56] References Cited

U.S. PATENT DOCUMENTS

| | | | |
|---|---|---|---|
| 4,348,256 | 9/1982 | Bergstrom et al. | 162/DIG. 10 X |
| 4,349,869 | 9/1982 | Prett . | |
| 4,358,822 | 11/1982 | Sanchez | 364/164 X |
| 4,577,270 | 3/1986 | Sugano et al. | 364/164 X |
| 4,616,308 | 10/1986 | Morshedi et al. | 364/159 |
| 5,032,976 | 7/1991 | Beller et al. | 364/165 X |

Primary Examiner—Jerry Smith
Assistant Examiner—Brian C. Oakes

[57] ABSTRACT

The feedback calculation for a dynamic matrix control (DMC) system has been modified so that it can accommodate a delay period between the time when the output variable is measured and when the measurement is available for feedback. This was accomplished by storing the projection vectors calculated by the DMC system and then comparing them to the output variable measurements as they become available. The algorithm was modified to handle planned production rate changes by adding another term to the equation used to calculate the projection vectors. This term involves multiplying the dynamic matrix for a given disturbance variable by a vector of future changes in that disturbance variable.

1 Claim, 4 Drawing Sheets

MULTIVARIABLE CONTROL OF A KAMYR DIGESTER

BACKGROUND OF INVENTION

The present invention relates to a method for the dynamic matrix control of a process in a pulp mill, namely a Kamyr digester.

Dynamic matrix control (DMC) methods are as old as the art. For example, the DMC methods disclosed in prior U.S. Pat. Nos. 4,349,869 and 4,616,308 comprise MV control algorithms which use mathematical models. These algorithms calculate values of one or more manipulable process variables to maintain one or more controlled variables at their setpoints. The calculations involve the use of predictions for the controlled variables based on the estimated response to changes in all the independent process variables (including the manipulated variables) which affect the controlled process variables. The algorithms calculate the future values of the manipulated variables which will minimize any future deviations of the controlled variables from their setpoints. Using predictions of the effect of the independent process variables on the controlled variables provides feedforward action for the control system and also minimizes the effects of interactions between the independent process variables which are manipulated to maintain the controlled variables at their setpoints.

The prior art methods of dynamic matrix control use periodic measurements of the controlled variable to correct the predictions used to calculate new values for the manipulated variables. The most recent prediction of the controlled variable is adjusted so that it matches the most recent measurement of the controlled variable. This provides feedback action for the algorithms. However, the measurement processes for controlled variables in some process systems may involve significant delay periods. This is particularly true when the controlled variable is a chemical composition and the measurement process involves collecting a sample and performing a wet lab experiment to determine its composition. The use of such a delayed measurement in the known DMC systems would result in severe errors in the control calculations, particularly if the controlled variable was changing rapidly.

The prior art DMC systems also use estimates of the response of the controlled variable to step changes in the independent variables. These are usually obtained by changing each independent variable while holding the others constant and recording the response of the controlled variable. However in many processes it is not possible to obtain step responses in this manner; the step responses must be obtained by examining a great deal of process data and estimating the step responses. Such estimates may be in error by as much as 20% due to process noise and unmeasured disturbances. This can also lead to severe errors in the control calculations, especially if there are large errors in the estimates of the process deadtime (i.e. the time between when an independent variable is changed and when the dependent variable starts to respond).

Finally, prior art methods of DMC may also use step response estimates of all the independent process variables which affect the controlled variable. The independent variables which are not manipulated are called disturbance variables. Using the step response information from these variables to calculate the predicted behavior of the controlled variable provides feedforward action for the control system. However, if there is a large deadtime in the step response for the manipulated variables and/or the disturbance variables, changes in the disturbance variables can lead to considerable errors in the controlled variable before the effect of changes in the manipulated variables drive the controlled variable back to its setpoint.

In contrast to the above, it is an object of the present invention to provide a method of DMC which provides the advantages of the feedforward and feedback aspects of the prior art methods yet addresses the problems inherent with deadtime in the feedforward action and delays caused by lengthy measurement processes.

SUMMARY OF THE INVENTION

In accordance with the present invention, a multivariable method of controlling a process involving variable deadtime in the controlled variable measurement and estimates of the step responses which might involve significant errors is provided. In the method, the process response to steps in each of the independent variables is estimated. These estimates may be expressed using simple first order transfer functions with time delay. The estimates are then converted to transfer function vectors and the transfer function vectors are converted into dynamic matrices. The transfer function vectors for each independent variable are used in conjunction with the respective changes in each independent variable to calculate the future changes in the behavior of the controlled variable. The future changes in the controlled variable are expressed as a projection vector. If future changes in any of the independent variables are known, the vector corresponding to these future changes is used in conjunction with the dynamic matrix for that variable to update the projection vector. Once the projection vector is updated based on the current and future changes in the independent variables, it is corrected for errors in the estimates of the transfer function vectors as well as for the effects of unmeasured disturbances. This correction is only performed when a measurement of the controlled variable becomes available. When a measurement becomes available, the projection vector whose first two elements' timestamps bracket the timestamp of the measurement are located. If there is no delay time associated with the measurement the most recent projection vector is used. The projection vector's prediction of the controlled variable at the time corresponding to the timestamp of the measurement is calculated by linear interpolation. The difference between the projection vector's prediction and the measurement is then multiplied by a number between 0.0 and 1.0. This number is referred to as the feedback filter and it serves to prevent the controller from overcorrecting due to noise in the measurement and errors in the estimates of the step response vectors. The filtered difference between the linearly interpolated prediction and the measurement is then added to each element of the most recent projection. This projection is then used in conjunction with the dynamic matrices for the manipulated variables to calculate a new set of moves for the manipulated variables which will drive the controlled variable towards its setpoint. The set of moves for the manipulated variables will be corrected to account for any future violations of operator imposed constraints.

As applied to the Kamyr digester, the DMC system of the present invention uses temperature, EA/Wood and extraction flow to control the Kappa number of the pulp. Measurement of the Kappa number of pulp may be correlated with the completeness of pulp delignification in the Kamyr digester. Kappa number is defined by the Technical Association of the Pulp and Paper Industry (TAPPI) in standard T-236. The known relationship between the Kappa number and the lignin content of pulp is as follows; the percent lignin in the pulp equals 0.147 times the Kappa number. However, the Kappa number method is normally not suited for on-line measurement because the pulping reaction must be terminated and the pulp ovendried in order to measure the Kappa number. Thus the DMC system proposed by the present invention provides a control means which enables the Kappa number to be used as a viable tool for insuring uniform pulp quality.

Other objectives, advantages, and applications of the present invention will be made apparent by the following detailed description of the preferred embodiments of the present invention.

DETAILED DESCRIPTION OF THE PREFERRED EMBODIMENTS

Figure 1:
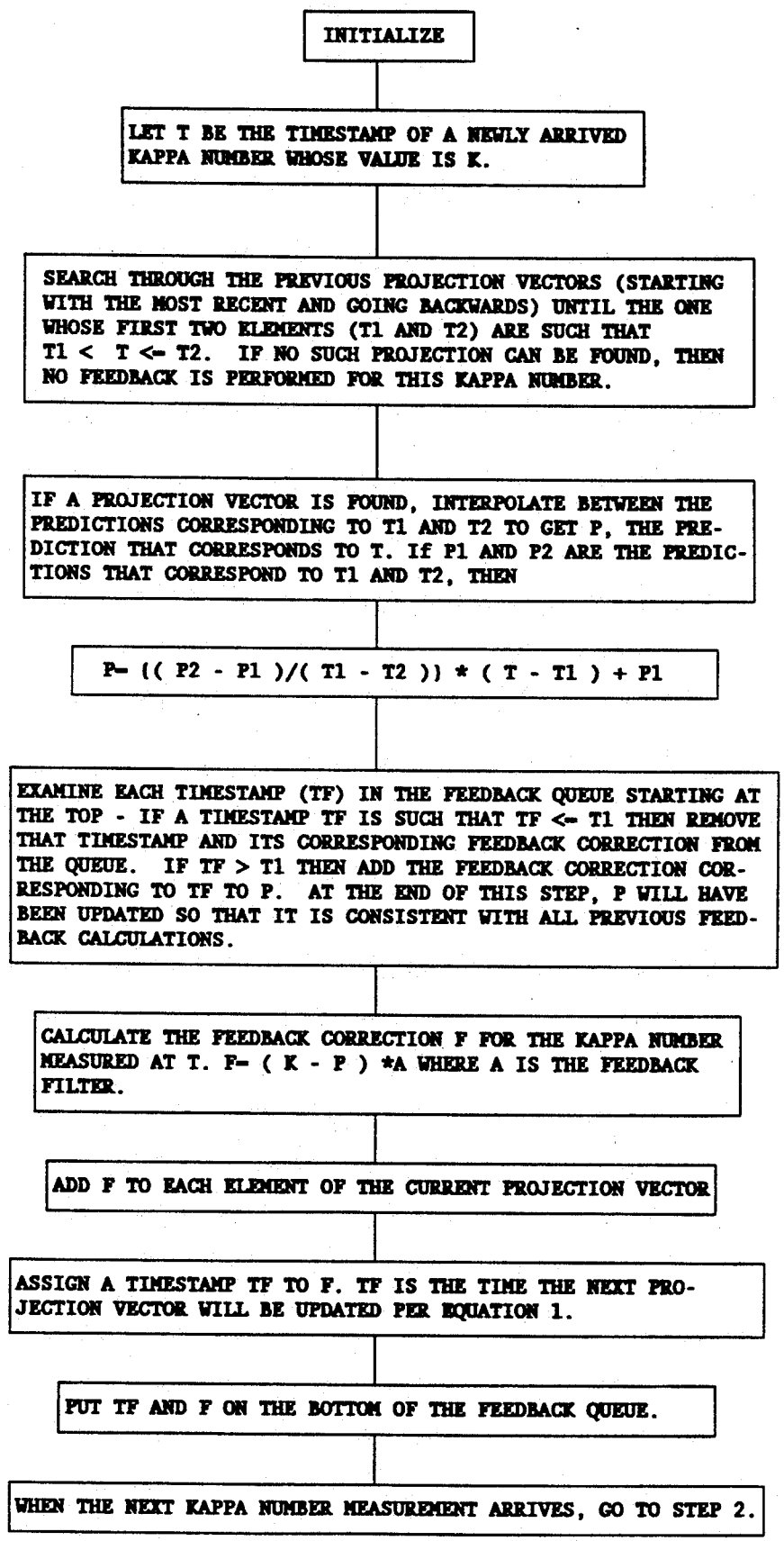
FIG. 1 illustrates a flow chart of the feedback calculation.

The DMC system of the present invention was designed specifically for the control of Kappa number in a Kamyr digester, however it may be applied to any multivariable control problem where there is a delay in sampling. The feedback calculation for the present DMC system has been modified so as to accommodate a delay period between the time when the output variable is measured and the time when the measurement is available for feedback. This was done by storing the projection vectors calculated by DMC and then comparing the appropriate ones to the output variable measurements as they become available. The algorithm was modified to handle planned production rate changes by adding another term of the equation used to calculate the projection vectors. The added term involves multiplying the dynamic matrix for a given disturbance variable by a vector of future changes in the disturbance variable.

The first step is to convert the estimates of the controlled variable's response to a unit step in each independent variable into a "step response vector", a, which is used to predict the process behavior. The elements of a contain the result of a unit step response at intervals of $\Delta t$. If an independent variable (also referred to as an input variable) is given a unit step at time zero, then $a_1$ is equal to the amount of change in a chosen output variable (i.e., the controlled variable) at time $\Delta t$, $a_2$ is equal to the output at time $2\Delta t$, and so on. The following notation will be used in this respect: a boldface a refers to a vector; $a_i$ refers to the ith element of vector a; a capital underlined $\underline{A}$ refers to a matrix; and a superscript refers to an input variable. For example, $a^i$ is the step response vector for the ith input variable.

The step response vector for each input variable is used to calculate a projection vector $P(t_i)$. The elements of the projection vector represent a prediction of the output variable some multiple of $\Delta t$'s into the future. For example, $P_1(t_i)$ is the predicted value of the output at time $t_{i+1}$, $P_2(t_i)$ is the predicted value of the output at time $t_{i+2}$, and so on. It is assumed that there is only one output variable for simplicity. The projection vector is calculated from the a vectors and the input variables as follows:

$$P(t_i) = P(t_i) + \sum_{j=1}^{u} a^j \cdot \Delta U^j(t_i) \tag{1}$$

where $\Delta U^j(t_i)$ is the change in input variable $j$ at time $t_i$ and u is the number of input variables. The input variables can be broken down into two groups: manipulated variables and measured disturbance variables. The manipulated variables are changed by the control algorithm to control the output variable. The disturbance variables affect the output variable response but the control system can only react to them—they cannot be changed. Manipulated variables are designated by the letter I; disturbance variables are designated by the letter D; and the letter U is used to refer to an input variable, which can be either a manipulated or a disturbance variable. It is important to realize that for the purpose of calculating the projection vector, there is no distinction made between manipulated variables and disturbance variables.

Equation 1 provides a good way of incorporating feedforward action into the algorithm (via the disturbance variables). However, if the process takes a long time to respond to changes in the manipulated variables, the controlled variable will deviate from the setpoint during the time between when the disturbance is detected and when the process responds to the resulting moves in the manipulated variables. If changes to the disturbance variables are known in the future, the algorithm can move the manipulated variables in anticipation of the future changes in the disturbance variables. The information concerning the future changes must be incorporated into the projection vector in time for the manipulated variables to be changed to counteract the effect of the future changes in the measured disturbances. Equation 1 must be modified in the following way:

$$P(t_i) = P(t_i) + \sum_{j=1}^{u} a^j \cdot \Delta U^j(t_i) + \sum_{j=1}^{u} \underline{A}^j \cdot \Delta D^j(t_i) \tag{1A}$$

where $\underline{A}^j$ is the dynamic matrix for the jth disturbance variable and $\Delta D^j(t_i)$ is a vector containing the future changes for the jth input. For example, if the chipmeter speed is to decrease by 1.0 at 2.0 hours and $t_i$ is 0.25 hours then $$\Delta D(0.25) = [0\ 0\ 0\ 0\ 0\ 0\ -1]^T$$

Let $I^1, I^2, \ldots I^x$ be the manipulated variables used to control the output. The basic algorithm involves finding the $\Delta I(t_i)$ that minimizes the deviation of the output variable from its setpoint over the output horizon, given the current projection $P(t_i)$. The $\Delta I(t_i)$ vector is called the control move vector. It consists of the series of changes to each manipulated variable into the future that will minimize the difference between the projected output and the setpoint.

$$\Delta I(t_i) = [\Delta I^1 \Delta I^2 \ldots \Delta I^x]^T$$

where $$\Delta I^1 = [\Delta I_1^1 \Delta I_2^1 \ldots \Delta I_{c1}^1]^T$$

For example, for manipulated variable 1, $\Delta I_1^1$ is the change in $I^1$ to be made at time $t_i$, $\Delta I_2^1$ is the change to be made at time $t_{i+1}$, and so on. The number of moves to be calculated for each manipulated variable, c, is called the "input horizon" for that manipulated variable. The input horizon may be different for each manipulated variable. The effect of $\Delta I(t_i)$ on the projection vector $P(t_i)$ (subsequently referred to as $\Delta I$ and $P$) is calculated using the dynamic matrix $\underline{A}$.

$$\delta P = \underline{A} \Delta I \quad (2)$$

where $$\underline{A} = [\underline{A}^1 \underline{A}^2 \ldots \underline{A}^x]$$

for example $$\begin{bmatrix} a^1 & 0 & 0 & . & . & . & 0 \\ a_2^1 & a_1^1 & 0 & 0 & . & . & 0 \\ a_3^1 & a_2^1 & a_1^1 & 0 & . & . & 0 \\ a_4^1 & a_3^1 & a_2^1 & . & . & . & 0 \\ . & . & . & . & . & . & 0 \\ . & . & . & . & . & . & 0 \\ . & . & . & . & . & . & 0 \\ a_q^1 & . & . & . & . & . & a_1^1 \\ . & . & . & . & . & . & a_2^1 \\ . & . & . & . & . & . & . \\ . & . & . & . & . & . & . \\ a_m^1 & . & . & . & . & . & a_q^1 \end{bmatrix} = \underline{A}^1$$

The matrices such as $\underline{A}^1$ that make up the dynamic matrix $\underline{A}$ are m×c (m rows by c columns) matrices where m is called the "optimization horizon" of $\underline{A}$. The vectors S (defined below), P, and a all have q elements—this is called the "output horizon". In this case m=q+c as shown above. The problem is to find the $\Delta I$ that minimizes the error between P and S, the projected setpoint. This can be formulated as a least squares problem with the following objective $$\min_{\Delta I} \{S - (P + \delta P)\}^2 \quad (3)$$

Substituting $E = S - P$ and equation 2 for $\delta P$ yields:

$$\min_{\Delta I} \{E - \underline{A} \Delta I\}^2 \quad (4)$$

The solution to this least squares problem is $$\Delta I = (\underline{A}^T \underline{A})^{-1} \underline{A}^T E \quad (5)$$

In general the solution to equation 5 is unsatisfactory—the control moves calculated are too large and oscillatory and the $\underline{A}^T \underline{A}$ matrix has a high condition number. The situation can be improved by introducing constraints on the inputs and writing the objective function as $$\min_{\Delta I} \{[E] - [A]\Delta I\}^2 \atop 0 \quad \underline{D} \quad (6)$$

where $\underline{D}$ is a n×n diagonal matrix of move suppression parameters and n is the sum of the input horizons. These move suppression parameters penalize the size of the control moves. In principle, each element of $\Delta I$ could have a unique move suppression value associated with it in $\underline{D}$. In practice, the first $c^1$ diagonal elements of $\underline{D}$ are set to the move suppression value for manipulated variable 1, the next $c^2$ elements are set to the move suppression value for variable 2, and so on. The modified solution is then $$\Delta I = (\underline{A}^T \underline{A} + \underline{D}^T \underline{D})^{-1} \underline{A}^T E \quad (7)$$

One can also specify constraints on the manipulated variables. Constraints are expressed as follows:

$$L_l^j \leq P^j(t_i) + \sum_{i=1}^{1,2,\ldots d} \Delta I_i^j \leq L_h^j \quad (8)$$

For example, a high limit violation for the third element of the second manipulated variable is expressed as $$P^2(t_i) + \sum_{i=1}^{3} \Delta I_i^2 > L_h \text{ or } P^2(t_i) > L_h - \sum_{i=1}^{3} \Delta I_i^2 \quad (9)$$

All of the constraints can be expressed together as $$\underline{H}^T \Delta I = E_H \quad (10)$$

where an element of $E_H = L_h - I(t_i)$ for a high limit violation and $E_H = I(t_i) - L_l$ for a low limit violation. His an n×r matrix where r is the number of constraint violations. For example, suppose n=5 and the first, third, and fourth elements of $\Delta I$ violate constraints. Then $$H^T = \begin{bmatrix} 1 & 0 & 0 & 0 & 0 \\ 1 & 1 & 1 & 0 & 0 \\ 1 & 1 & 1 & 1 & 0 \end{bmatrix}$$

The objective function is now written as $$\min_{\Delta I} [\{[E] - [A]\Delta I\}^2 + \beta \{E_H - H^T \Delta I\}^2] \atop 0 \quad \underline{D} \quad (11)$$

The constrained solution is $$\Delta C = (\underline{G} + \underline{HH}^T)^{-1}(\underline{A}^T E + \underline{H} E_H) \quad (12)$$

where $\underline{G} = (\underline{A}^T \underline{A})^{-1}$ and $E_H$ and $\underline{H}^T$ are now weighted by the penalty parameter $\beta$.

In order to avoid inverting $(\underline{G} + \underline{HH}^T)$ every calculation the Sherman-Morrison-Woodbury formula is used to convert equation 12 to the following form $$\Delta C = \Delta I + \underline{GH}(I + \underline{H}^T \underline{GH})^{-1}(E_H - \underline{H}^T \Delta I) \quad (13)$$

This reduces the problem to inverting a matrix whose size depends only on the number of constraint violations. The penalty parameter $\beta$ in equation 11 is typically set to a very high number (e.g. $10^6$) in order to ensure that the algorithm enforces the limit constraints.

The feedback calculation for the prior art at time $t_i$ involves comparing $P_1(t_{i-1})$ to $O(t_i)$, the measured value of the output at $t_i$. This feedback step is the first part of the calculation.

$$P(t_{i-1}) = P(t_{i-1}) + 1^*(O(t_i) - P_1(t_{i-1})) \tag{14}$$

where $$1^T = [1\ 1\ 1\ \ldots\ 1]$$

The resulting $P(t_{i-1})$ is then converted to $P(t_i)$ by shifting its elements in the following manner: $P_1(t_i) = P_2(t_{i-1})$, $P_2(t_i) = P_3(t_{i-1})$, . . . $P_{q-1}(t_i) = P_q(t_{i-1})$, $P_q(t_{i-1}) = P_q(t_{i-1})$. After the feedback calculation is performed, equation 1 is used to update the projection based on the changes in the input variables. The control moves are calculated from $P(t_i)$ using equation 7 and then equation 13 if necessary.

Unfortunately, the delay requires some modifications to equation 14. The simplest way of handling the delay in the output variable is to store each projection vector after it is used to make a control calculation. When a measurement becomes available the projection vector whose first two elements bracket the timestamp of the measurement is used for the feedback calculation. For example, suppose that at time $t_i - d$ a sample is collected and the measurement becomes available at time $t_i$. The feedback calculation at $t_i$ is $$P(t_{i-1}) = P(t_{i-1}) + 1^*(O(t_i - d) - P(t_i - d)) \tag{15}$$

where $$P(t_i - d) = (P_2(t_{i-z}) - P_1(t_{i-z}))^*(t_i - d - t_{i-z})\Delta t + P_1(t_{i-z})$$

and $$z\Delta t \leq d < (z+1)\Delta t$$

and $$1^T = [1\ 1\ 1\ \ldots\ 1]$$

This approach requires that a record be kept of which projection vectors have been updated by the feedback calculations and when. The problem can be illustrated by the following example. Suppose $O(t_{i-5})$ becomes available at $t_i$; then by equation 15, $P(t_{i-6})$ is used to calculate the feedback update to $P(t_i)$. Suppose $O(t_{i-2})$ becomes available at $t_{i+4}$; then $P(t_{i-3})$ must be used to update $P(t_{i+4})$. However, $P(t_{i-3})$ does not contain the feedback correction for $O(t_{i-5})$.

The simplest solution to this problem would be to correct all the projections between $t_{i-5}$ and $t_i$ when the feedback calculation associated with $O(t_{i-5})$ is made. However, the approach of the present invention is to maintain a queue of the previous feedback corrections and their timestamps and then use this queue to ensure that a projection vector contains the results of all previous feedback calculations before it is used in the current calculation. The advantage of the second approach is that it allows the projection vectors to be stored in the form they were used to make the control calulations. Plotting these projection vectors provides the operator/engineer with a way of identifying model-process mismatch and generally determining the reasons the algorithm is making the control moves it is.

Equation 15 was further modified to take advantage of one of the more attractive features of the Internal Model Control structure, namely, the presence of the filter in the feedback loop. This improves the quality of the control a great deal by reducing the effect of inaccuracies in the control model. The calculation with the feedback filter is $$P(t_{i-1}) = P(t_{i-1}) + 1^*(O(t_{i-d}) - P(t_i - d))^*\alpha \tag{16}$$

where $P(t_i - d)$ is the same as in equation 15. The filter parameter $\alpha$ must be chosen so that $0 \leq \alpha \leq 1$. As $\alpha$ approaches 0 the control action is slowed and the impact of modelling errors on the performance is reduced. The feedback filter also serves to keep the noise in the output variable from moving the projection vector around unnecessarily. FIG. 1 contains a step by step description of the feedback algorithm.

To facilitate an understanding of the invention, the method will be described for use to control the pulp Kappa number of a Kamyr digester.

Good Kappa number control is essential to the efficient operation of both bleached and unbleached pulp mills. Reduced variability in the Kappa number allows the Kappa number setpoint to be increased—thus providing a higher yield and production rate without an increase in the amount of wood fed to the digester. Severe deviations from the Kappa number setpoint can result in screening problems which may force a reduction in the production rate. Deviations from the Kappa number target also result in poor pulp quality as well as higher energy and chemical costs. The bleach plant must produce pulp of uniform brightness and strength using the lowest possible amount of bleaching agents such as chlorine, chlorine dioxide, and caustic. Variations in the incoming Kappa number make it difficult to achieve this goal.

Figure 2:
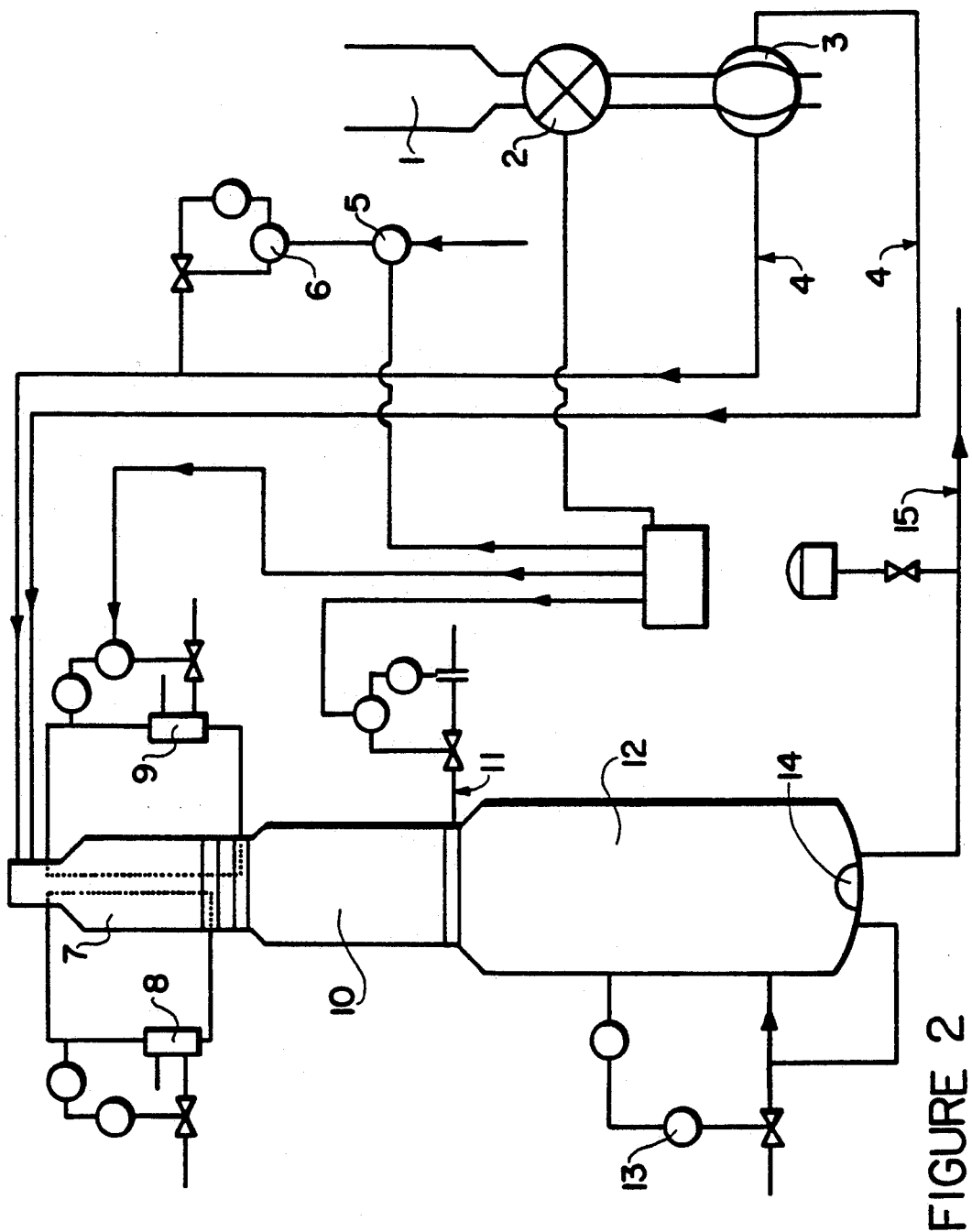
FIG. 2 is a schematic of a typical process which may be controlled by the DMC system of the invention.

A simplified flow diagram of a Kamyr digester is shown in FIG. 2. Wood chips enter the chip bin 1 and fall into the chipmeter 2. The production rate is set by the chipmeter speed. The chips go from the chipmeter to the high pressure feeder 3 which pumps the chips to the top of the digester through the top circulation line 4. The top circulation line contains a mixture of chips and cooking liquor. The cooking liquor equipment is not shown. The EA/Wood controller 5 uses the EA/Wood setpoint and the production rate setpoint to calculate the setpoint for the white liquor controller 6. The chips enter the top of the digester and pass down through the impregnation zone 7 which provides retention time for the white liquor to diffuse into the chip pores. The temperature of the chips/liquor is raised to 270-300 degrees F. by the upper heater 8. Liquor is pulled out of the digester through a screen and pumped through the upper heater where the temperature is raised by indirect contact with steam. The chips/liquor are brought to their cooking temperature by the lower heater 9. The temperature setpoint for the lower heater is the most important process variable used to control the Kappa number. The cook zone 10 provides retention time for the delignification reactions to proceed. These reactions are stopped or slowed by the extraction flow 11. The extraction flow lowers the temperature in the wash zone 12 by removing hot liquor. As the extraction flow is increased the pressure controller 13 increases the flow of filtrate to the bottom of the digester. This also lowers the temperature in the wash zone.

The lower heater (LHTR) temperature, EA/Wood (EA/W) setpoint, and the extraction flow are typically the only variables which can be used to control the Kappa number. The blow line Kappa number response to changes in these process variables is characterized by time delays (deadtimes) on the minutes. The deadtimes for the LHTR temperature and EA/W response are 2–4 hrs, depending on the size of the digester and the production rate. There is no deadtime for the extraction flow response. The extraction flow has a considerable effect on the chip flow in the wash zone—this places some constraints on the range of the extraction flow setpoint. If the extraction flow is too high the chips may plug the extraction screen and "hang" the digester by slowing or stopping chips from moving past the screen altogether. If the extraction flow is too low, the force of the chips may damage the outlet device 14, which scrapes the chips out of the bottom of the digester and into the blow line 15.

The control problem is further complicated by the fact that the nature of the Kappa number response for the manipulated variables is quite difficult to quantify accurately. The operation is subject to widely varying chip quality and frequent changes in the production rate. These disturbances can result in large variations in the Kappa number if they are not controlled properly. The Kappa number test is a wet lab procedure. It requires the tester to dry the pulp sample for a period of time; run the permanganate reaction for 5 or 10 minutes; and then determine the remaining permanganate by titration. Most pulp mills sample the Kappa number at most once an hour and it requires up to an hour from the time the sample is collected to the time the Kappa number is available for control calculations. To further complicate the problem, the sampling delay time is not constant, the Kappa number may be available anywhere from 30–60 minutes after the sample is collected. Meanwhile the control system should use the Kappa number as soon as it becomes available.

The advantages of using the present invention are demonstrated using a detailed computer simulation of a Kamyr digester as the process. The invention is used to control a production rate change from 12 to 13 rpm (chipmeter speed). The LHTR temperature and the EA/W are used as manipulated variables. The chipmeter speed and the extraction flow are used as measured disturbances. The extraction flow is used as a measured disturbance because it must be increased for an increase in production rate to avoid damaging the outlet device. This prevents the control system from decreasing the extraction flow in response to the increase in Kappa number caused by the production rate increase. Once the production rate increase is over, the extraction flow can be used as a manipulated variable.

Figure 3:
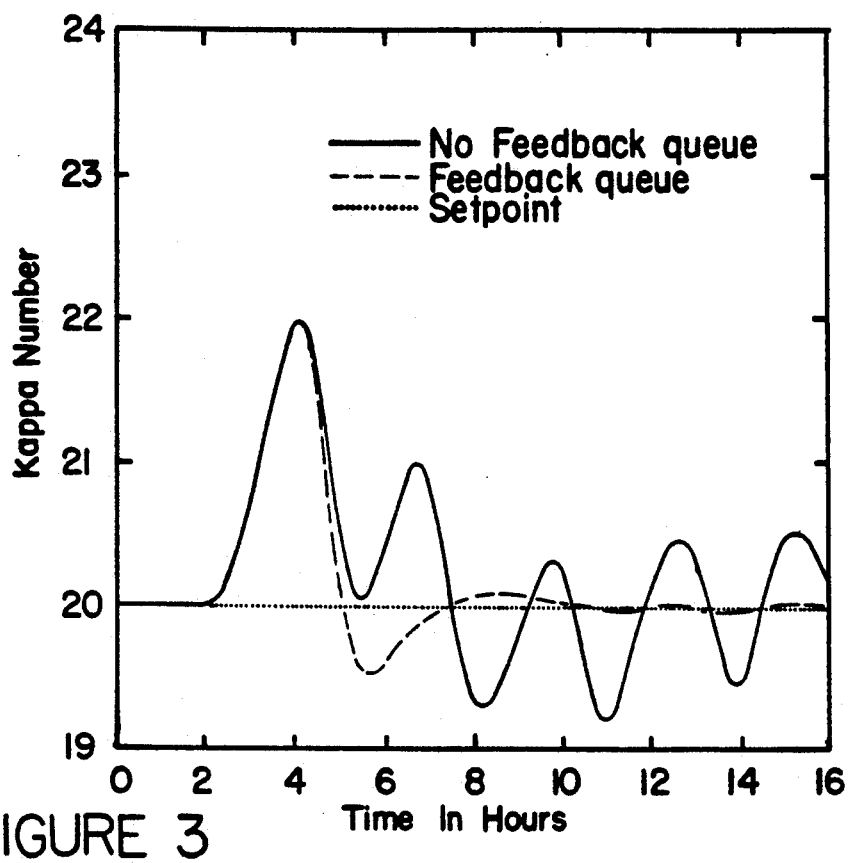
FIG. 3 is a graph showing the effectiveness of the use of the feedback queue algorithm.

FIG. 3 contains the results of using the invention to control an unplanned production rate change. In an unplanned production rate change, the chipmeter speed and extraction flow are treated as measured disturbances per equation 1. FIG. 3 illustrates why the feedback queue is required for Kappa number control. The solid line shows the result of not using a feedback queue, i.e., as each Kappa number becomes available it is used to update the most recent projection vector. The dotted line shows the results for the same unplanned production rate change using the feedback queue described in FIG. 1. In both cases the sampling delay for the Kappa number measurement was 1.0 hour and "perfect" step response vectors were used.

Figure 4:
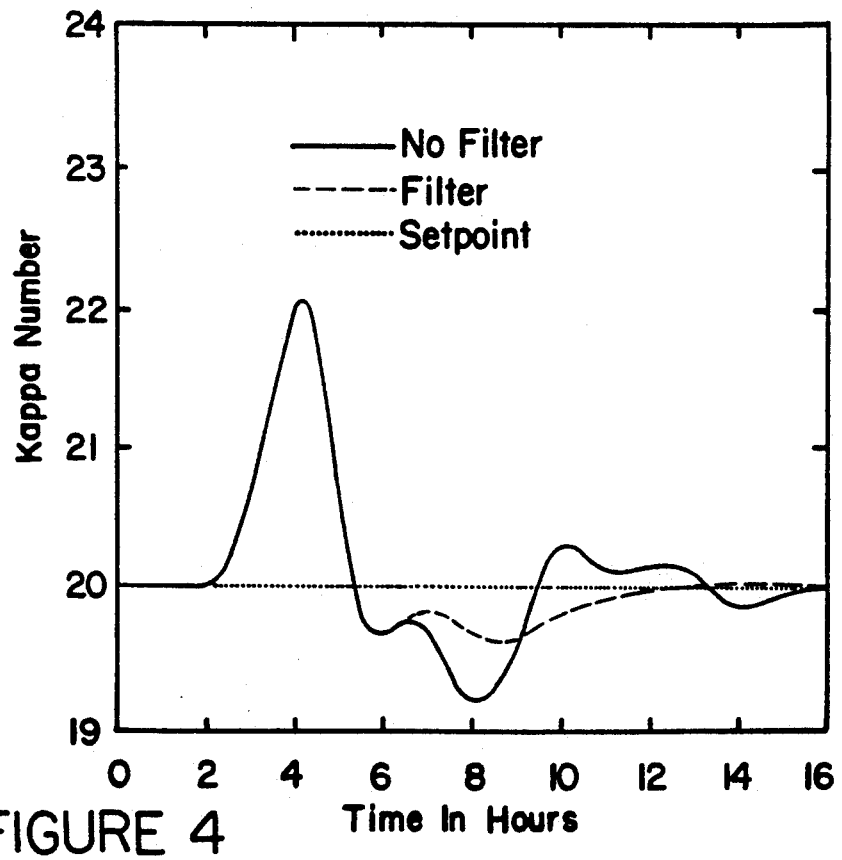
FIG. 4 is a graph showing the effectiveness of the use of the feedback filter; and, FIG. 5 is a graph showing the planned production rate change capability.

FIG. 4 also shows the results of using the invention for an unplanned production rate change. In this case, however, there is a considerable amount of error in the estimates for the step response vectors. The step response vectors are approximated from deadtime, lag and gain models with 20% error in each of the 3 three parameters. The solid line shows the result using a filter value of 1.0 (no filter). The dashed line shows the result of using a filter value of 0.35. The use of the filter clearly increases the stability and improves the performance of the controller in the face of model error.

Figure 5:
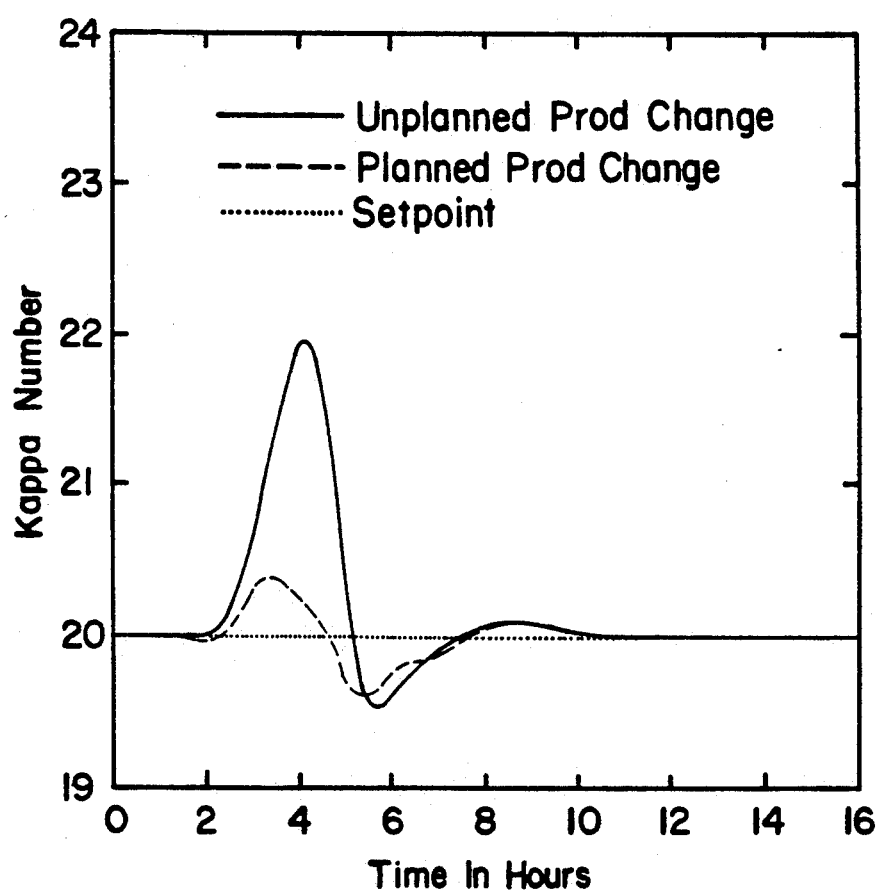

FIG. 5 illustrates the benefits of performing a planned production increase compared to an unplanned production increase. The solid line is the unplanned roduction increase shown in FIG. 3. The dotted line shows the result of using the chipmeter speed and extraction flow as measured disturbances per equation 1A.

While the method disclosed herein effectively performs the objects of the present invention, it will be understood that various modifications of this control technique may occur to those skilled in the art and it is intended that this invention be limited only by the scope of the appended claims.

What is claimed is:

1. A method for controlling the Kappa number of pulp produced in a Kamyr digester process, said method comprising:
   (a) estimating the effect of a perturbation in the digester variables consisting of the lower heater temperature and EA/Wood ratio on the Kappa number and expressing the effect as a first step response in a control algorithm;
   (b) estimating the effect of a perturbation in the digester variables consisting of the upper heater effective alkali and chip-meter speed on the Kappa number and expressing said effect as a second step response in a control algorithm;
   (c) periodically measuring the variables of (a) and (b) and using said measurements in conjunction with the step responses from (a) and (b) to calculate a prediction of the future behavior of the Kappa number expressed as a projection vector in a control algorithm;
   (d) correcting the projection vector of step (c) in anticipation of any known future changes in the variables of (a) and (b);
   (e) periodically measuring the Kappa number, which measurement involves a significant time delay, and updating the prediction of step (c) based on the difference between the most recent measured value of said Kappa number and a linearly interpolated value of at least two previous predictions for said Kappa number whose timestamps bracket the timestamp of the most recent measured value, and using said comparison to update the most recent prediction of the future behavior of the Kappa number;
   (f) using the updated prediction of step (c) to calculate new values of the variables of step (a) to drive the Kappa number to its desired setpoint; and,
   (g) comparing the new values of the variables of step (a) obtained in step (f) to their high and low limit constraints and recalculating new values of the variables of step (a) to drive the Kappa number to its desired setpoint while enforcing the constraints on the variables of step (a).

* * * * *